(No Model.)
G. HUTTER.
CORNER MANGER.
No. 439,298. Patented Oct. 28, 1890.
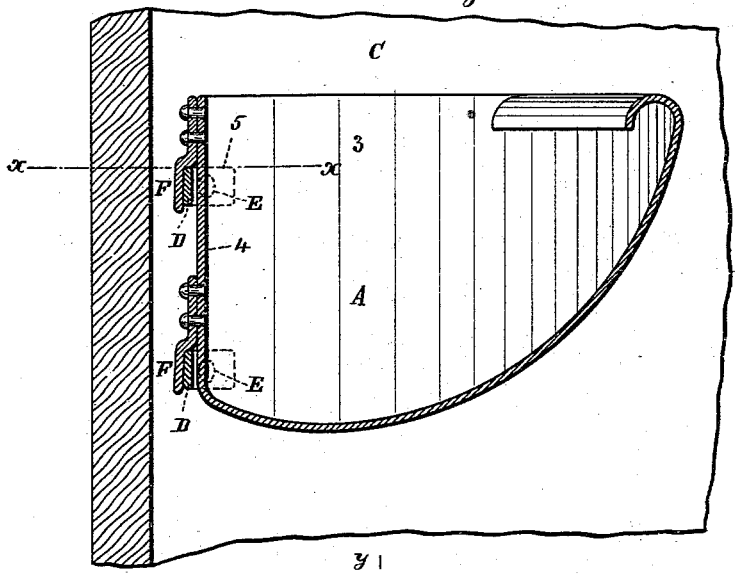
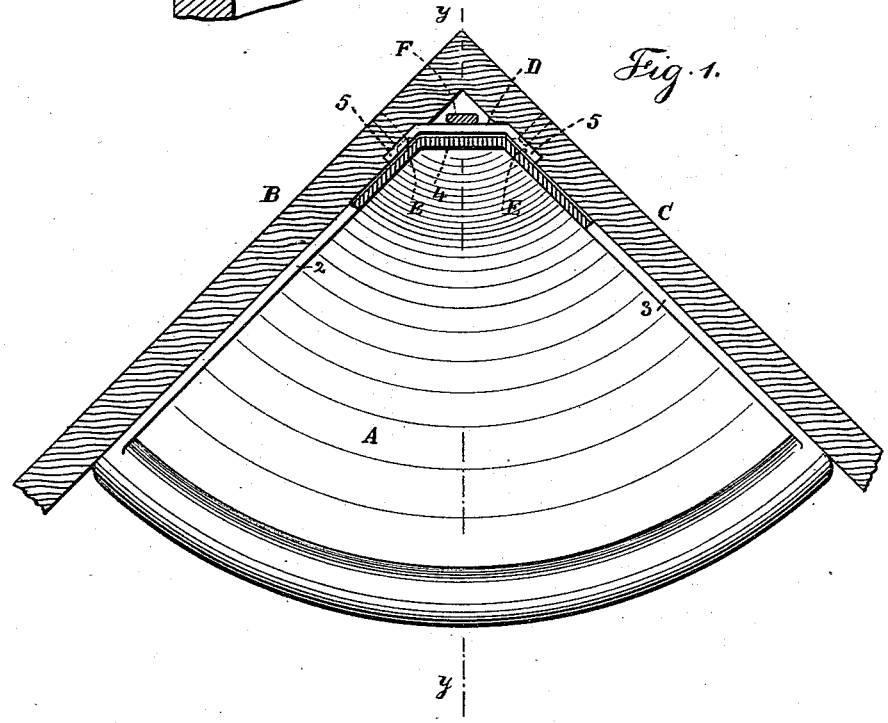
Witnesses:
J. Staib
Chas H Smith
Inventor:
George Hutter
per Lemuel W. Serrell
Atty

UNITED STATES PATENT OFFICE.

GEORGE HUTTER, OF BROOKLYN, ASSIGNOR TO THE J. L. MOTT IRON WORKS, OF NEW YORK, N. Y.

CORNER MANGER.

SPECIFICATION forming part of Letters Patent No. 439,298, dated October 28, 1890.

Application filed July 19, 1890. Serial No. 359,268. (No model.)

*To all whom it may concern:*

Be it known that I, GEORGE HUTTER, of Brooklyn, in the county of Kings and State of New York, have invented an Improvement in Attachments for Corner Mangers, of which the following is a specification.

Mangers have heretofore been connected with the walls of stalls by hooks passing through mortises in plates that are permanently attached to the walls; but with brick stalls there is difficulty in cutting into the brick-work sufficiently for allowing the hooks to pass in behind the plates, and under all circumstances the openings made in the wall become receptacles for vermin, and in cases where attachments have projected on the surface of the wall they are liable to injure the horse or other animal by contact with his skin.

The object of the present invention is to attach the manger in the corner or angle of the stall removably and in such a manner that there will be no opportunity for the accumulation of vermin or for the animal to injure himself, and the devices attached to the wall of the stall extend upon both surfaces near the angle, so that the screws or nails pass off in different directions and hold the attaching device in the most reliable manner.

In the drawings, Figure 1 is a plan view, partly in section, at the line $x$ $x$ of Fig. 2; and Fig. 2 is a vertical section at the line $y$ $y$.

The manger A is to be of any desired size or pattern, and the sides 2 and 3 are at right angles to each other, or nearly so; but instead of these sides 2 and 3 meeting at a sharp corner or angle there is a diagonal plate or side 4 between the two sides 2 and 3, so that the manger does not go into the corner of the stall, and there is sufficient space left for the introduction of the attaching devices within the angle of the wall or stall and between the same and the diagonal portion 4 of the manger.

Across the angle between the walls B and C there are one or two supporting-plates D, passing diagonally, and having the end portions or flanges 5 recessed or let into the respective walls B and C and firmly secured thereto by screws or bolts E, and upon the manger A there are one or two fingers F, permanently attached at their upper ends upon the surface 4 of the manger, and the lower portions of these fingers are offset from the manger, so as to be slipped in behind the supporting-plates D, there being sufficient space in the angle between the walls B and C for such fingers to pass down behind the supporting-plates D. Usually I make use of two supporting-plates and two fingers—one above the other—as a means for supporting the manger in the angle of the stall; or but one of these fingers and supporting-plates may be made use of, especially where the manger is small. It will be apparent that these supporting-plates D are so close into the corner of the stall that the animal has no opportunity to injure himself against the same, and the corner can be cleaned out with facility, because these supporting-plates are of comparatively narrow width. It, however, will be apparent that the supporting-plates may be of any desired width, and they may be included in one casting instead of being separate pieces, if so desired.

I claim as my invention—

1. The combination, with the manger adapted to fit into a corner and having a diagonal side 4, of the supporting-plate D, having flanges that extend upon the walls of the stall and are fastened thereto, and a finger attached to the manger and passing down behind the supporting-plate for sustaining such manger, substantially as set forth.

2. A manger A, having sides 2 and 3 at right angles, or nearly so, to each other, and a diagonal side 4, in combination with supporting-plates D, extending upon the surface of the stall near the angle and fastened thereto, and the fingers F, attached to the manger and adapted to pass into the angle and behind the supporting-plates, substantially as set forth.

Signed by me this 8th day of July, 1890.

GEORGE HUTTER.

Witnesses:
R. HENDERSON,
JOHN R. MOORE.